(12) United States Patent
Eichelberger et al.

(10) Patent No.: US 11,713,904 B2
(45) Date of Patent: Aug. 1, 2023

(54) TUNABLE SOUND ATTENUATING MODULES

(71) Applicant: Johnson Controls Technology Company, Auburn Hills, MI (US)

(72) Inventors: Curtis Eichelberger, York, PA (US); Paul Francis Bauch, York, PA (US); Rajavel Balaguru, New Cumberland, PA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 840 days.

(21) Appl. No.: 16/589,903

(22) Filed: Oct. 1, 2019

(65) Prior Publication Data

US 2021/0095888 A1    Apr. 1, 2021

(51) Int. Cl.
  *F24F 13/24*    (2006.01)
  *F01N 1/02*    (2006.01)
  *G10K 11/172*    (2006.01)

(52) U.S. Cl.
  CPC .............. *F24F 13/24* (2013.01); *F01N 1/023* (2013.01); *G10K 11/172* (2013.01); *F24F 2013/245* (2013.01)

(58) Field of Classification Search
  CPC .. F24F 13/24; F24F 2013/245; G10K 11/172; F01N 1/023; F16L 55/033
  USPC .................................................. 181/224, 225
  See application file for complete search history.

(56) References Cited

U.S. PATENT DOCUMENTS

| | | | | | |
|---|---|---|---|---|---|
| 2,881,337 | A | * | 4/1959 | Wall | G10K 11/172 310/57 |
| 2,916,101 | A | * | 12/1959 | Naman | G10K 11/172 181/224 |
| 4,091,892 | A | * | 5/1978 | Hehmann | G10K 11/172 181/252 |
| 4,287,962 | A | * | 9/1981 | Ingard | F02M 35/1272 181/268 |
| 4,645,032 | A | * | 2/1987 | Ross | F02C 7/24 181/224 |
| 5,276,291 | A | * | 1/1994 | Norris | F24F 13/24 181/224 |
| 5,473,124 | A | * | 12/1995 | Yazici | F24F 13/24 454/906 |
| 5,728,979 | A | * | 3/1998 | Yazici | F24F 7/08 181/224 |

(Continued)

FOREIGN PATENT DOCUMENTS

| | | | |
|---|---|---|---|
| DE | 102018116681 A1 | * | 1/2020 |
| KR | 200418061 Y1 | * | 6/2006 |
| WO | WO-2013114807 A1 | * | 8/2013 ........... G10K 11/172 |

*Primary Examiner* — Jeremy A Luks
(74) *Attorney, Agent, or Firm* — Fletcher Yoder, P.C.

(57) ABSTRACT

Aspects of the present disclosure include a casing comprising an air inlet and an air outlet, a fan configured to move air from the air inlet to the air outlet, and a tunable sound attenuating module having an opening at a first end of the tunable sound attenuating module, a cavity, and a back wall at a second end of the tunable sound attenuating module, wherein: the tunable sound attenuating module is oriented such that the back wall is closer to the fan than the opening, and a length of tunable sound attenuating module is substantially one fourth of the acoustic wavelength of a sound generated by the fan.

33 Claims, 5 Drawing Sheets

(56) References Cited

U.S. PATENT DOCUMENTS

| | | | | |
|---|---|---|---|---|
| 5,869,792 A * | 2/1999 | Allen | .............. | F02M 35/1216 |
| | | | | 181/224 |
| 6,419,576 B1 * | 7/2002 | Han | .............. | F24F 13/24 |
| | | | | 454/906 |
| 6,607,432 B2 * | 8/2003 | Schaake | .............. | F16L 55/033 |
| | | | | 454/143 |
| 7,891,464 B2 * | 2/2011 | Tang | .............. | F04D 29/663 |
| | | | | 181/224 |
| 7,992,674 B2 * | 8/2011 | Gorny | .............. | F04D 29/663 |
| | | | | 415/119 |
| 8,770,340 B2 | 7/2014 | Cursetjee | | |
| 9,791,166 B2 | 10/2017 | Rainey et al. | | |
| 2001/0011007 A1 * | 8/2001 | Akhtar | .............. | F24F 7/007 |
| | | | | 454/906 |
| 2002/0108810 A1 * | 8/2002 | Kudernatsch | .............. | F01D 25/30 |
| | | | | 181/224 |
| 2005/0161280 A1 * | 7/2005 | Furuya | .............. | F01N 1/023 |
| | | | | 181/224 |
| 2007/0292261 A1 * | 12/2007 | Tang | .............. | F04D 29/663 |
| | | | | 415/119 |
| 2008/0233856 A1 * | 9/2008 | Okawa | .............. | F16L 55/033 |
| | | | | 454/143 |
| 2017/0030610 A1 * | 2/2017 | Schaake | .............. | G10K 11/172 |
| 2019/0206380 A1 * | 7/2019 | Hakuta | .............. | F24F 13/02 |
| 2020/0066245 A1 * | 2/2020 | Lee | .............. | G10K 11/162 |
| 2020/0126532 A1 * | 4/2020 | Ohtsu | .............. | G10K 11/172 |
| 2021/0012762 A1 * | 1/2021 | Ohtsu | .............. | G10K 11/161 |
| 2021/0233507 A1 * | 7/2021 | Sugawara | .............. | G10K 11/162 |

\* cited by examiner

TUNABLE SOUND ATTENUATING MODULES

BACKGROUND

Environmental comfort is an important concern to occupants in a modern structure. Heating, ventilation, and air conditioning (HVAC) equipment not only maintains a more uniform distribution of temperatures, but also allows for better comfort control of individual spaces. Various HVAC equipment, such as an air handling unit, may filter, humidify or dehumidify, and/or heat or cool to a predetermined temperature. The air handling unit may move treated primary air into one or more supply ducts that circulate the primary air throughout the structure to the various regions. However, an air handling unit may include various components (e.g., fans, humidifier/dehumidifier, etc.) that create sound. The sound may be undesirable to the occupants in the modern structure. Therefore, it may be desirable to reduce the sound in HVAC equipment, such as the air handling unit.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes an air handling unit having a casing comprising an air inlet and an air outlet, a fan configured to move air from the air inlet to the air outlet, and a tunable sound attenuating module having an opening at a first end of the tunable sound attenuating module, a cavity, and a back wall at a second end of the tunable sound attenuating module, wherein: the tunable sound attenuating module is oriented such that the back wall is closer to the fan than the opening, and a length of tunable sound attenuating module is substantially one fourth of the acoustic wavelength of a sound generated by the fan.

Some aspects of the present disclosure includes an HVAC equipment having a casing having an air inlet at a first end of the HVAC equipment and an air outlet at the second end of the HVAC equipment, a fan disposed between the air inlet and the air outlet, wherein the fan is configured to move air entering the casing from the air inlet toward the air outlet, a tunable sound attenuating module having an opening at a first end of the tunable sound attenuating module, a cavity, and a back wall at a second end of the tunable sound attenuating module, wherein the first end of the tunable sound attenuating module is detachably coupled to the first end of the HVAC equipment or the second end of the HVAC equipment.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

In an aspect of the present disclosure, a tunable sound attenuating module may be placed in or against an air handling unit to reduce sound generated from components of the air handling unit. For example, the fan blades of the fan in the air handling unit may generate sound at a particular frequency or a frequency range during rotation. The tunable sound attenuating module may be placed near the fan to suppress the generated sound. The tunable sound attenuating module may be configured to reduce sound of a particular frequency or frequency range. The length of the tunable sound attenuating module may be inversely related to the frequency or frequency range.

Figure 1:
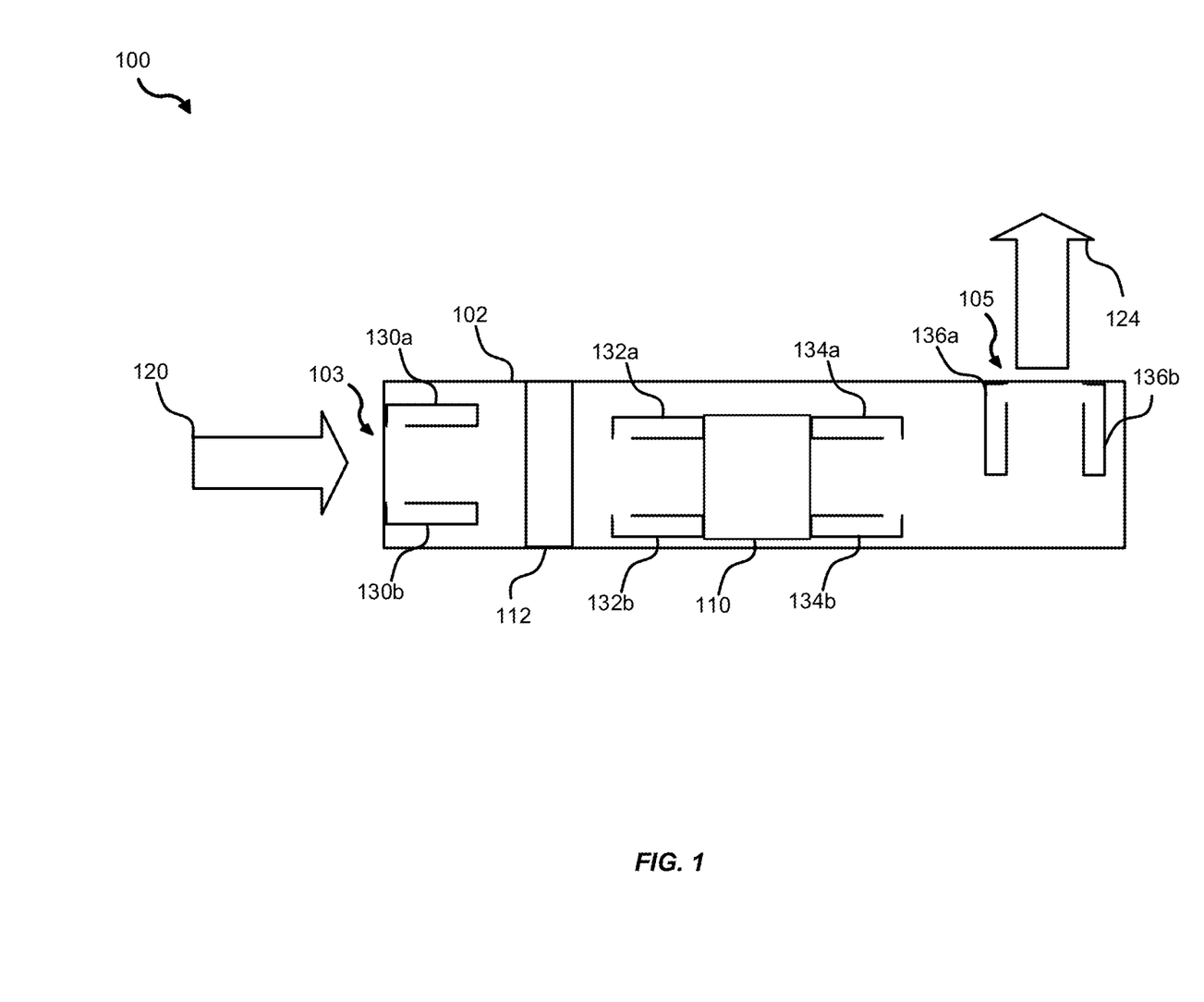
FIG. 1 illustrates an example of a side view of an air handling unit having one or more tunable sound attenuating modules according to aspects of the present disclosures.

Turning now to FIG. 1, which shows an example of a side-view of an air handling unit 100. The air handling unit 100 may include a casing 102. The casing 102 may include an air inlet 103 that receives air 120 via a duct (not shown). The air 120 may be discharged from the air handling unit 100 as room air 124 at an air outlet 105. The air handling unit 100 may include a fan 110 and a cooling coil 112. The cooling coil 112 may be a cold water coil, an electric cooling coil, or other cooling coils that cools air. The cooling coil 112 may cool the air 120 as the air 120 passes through. In alternative implementations, the cooling coil 112 may be replaced with a heating coil. The heating coil may warm the air 120 as the air 120 passes through.

In some aspects of the present disclosures, the air handling unit 100 may include a first set of tunable sound attenuating modules 130, a second set of tunable sound attenuating modules 132, a third set of tunable sound attenuating modules 134, and a fourth set of tunable sound attenuating modules 136. The first set of tunable sound attenuating modules 130 may be disposed at or substantially at the air inlet 103. The second set of tunable sound attenuating modules 132 may be disposed at or substantially at one end of the fan 110 (e.g., in front of the fan 110). The third set of tunable sound attenuating modules 134 may be disposed at or substantially at another end of the fan 110. The fourth set of tunable sound attenuating modules 136 may be disposed at or substantially at the air outlet 105. In some instances, the fan 110 may generate sound at a frequency $f_1$ or a frequency range $f_2$-$f_3$. The first, second, third, and four sets of tunable sound attenuating modules 130, 132, 134, 136 may each have a length configured to suppress the frequency $f_1$ or the frequency range $f_2$-$f_3$. For example, the length of the first, second, third, and four sets of tunable sound attenuating modules 130, 132, 134, 136 may be a quarter of the acoustic wavelength of the frequency $f_1$ or within an acoustic wavelength range of the frequency range $f_2$-$f_3$. For example, if the frequency $f_1$ is 1 kilohertz (KHz), the length of the first, second, third, and four sets of tunable sound attenuating modules 130, 132, 134, 136 may be 8.5 centimeters (cm) long. In another non-limiting example, if the frequency range $f_2$-$f_3$ is between 1 KHz and 2 KHz, the length of the first, second, third, and four sets of tunable sound attenuating modules 130, 132, 134, 136 may be between 4.25 and 8.5 cm long. The wavelength of an acoustic wave may be proportional to the propagation velocity of the acoustic wave and inversely proportional to the frequency of the acoustic wave. In some implementations, tunable sound attenuating modules targeting different frequencies may be placed at different points of the air flow.

Figure 2:
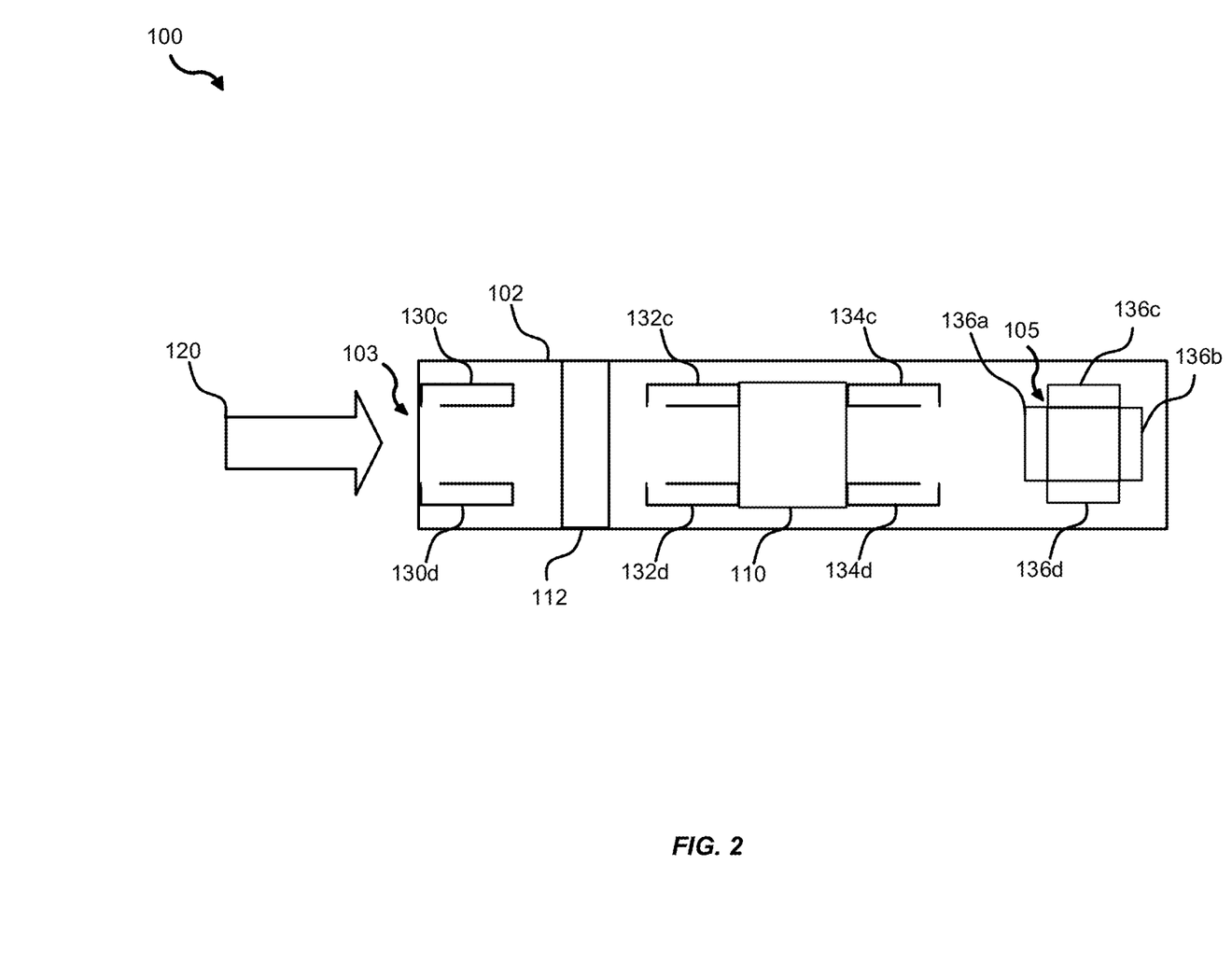
FIG. 2 illustrates another example of a plan view of an air handling unit having one or more tunable sound attenuating modules according to aspects of the present disclosures.

Turning now to FIG. 2, and referencing FIG. 1, which shows an example of a plan (top) view of the air handling unit 100. The first set of tunable sound attenuating modules 130 may include tunable modules 130a, 130b, 130c, 130d. The second set of tunable sound attenuating modules 132 may include tunable modules 132a, 132b, 132c, 132d. The third set of tunable sound attenuating modules 134 may include tunable modules 134a, 134b, 134c, 134d. The fourth set of tunable sound attenuating modules 136 may include tunable modules 136a, 136b, 136c, 136d.

In some implementations, the first, second, third, and four sets of tunable sound attenuating modules 130, 132, 134, 136 may be disposed such that the opening (discussed later) of the first, second, third, and four sets of tunable sound attenuating modules 130, 132, 134, 136 is away from the source of the sound, such as the fan 110.

In certain aspects of the present disclosures, the air handling unit 100 may include any one of or any combination of the first, second, third, and four sets of tunable sound attenuating modules 130, 132, 134, 136. For example, in one aspect, the air handling unit 100 may include the tunable sound attenuating modules 130a, 130b, 132a, 132b, 134a, 134b, 136a, 136b. In another non-limiting example, the air handling unit 100 may include the tunable sound attenuating modules 130a, 130b, 130c, 130d, 136a, 136b, 136c, 136d (at or substantially at the air inlet 103 and the air outlet 105). In yet another aspect of the present disclosures, the air handling unit 100 may include the tunable sound attenuating modules 132a, 132b, 132c, 132d, 134a, 134b, 134c, 134d (at or substantially at the fan 110). In some instances, the air handling unit 100 may include the tunable sound attenuating modules 134a, 134b, 134c, 134d, 136a, 136b, 136c, 136d (at or substantially at the downstream of the fan 110). Other combinations of the first, second, third, and four sets of tunable sound attenuating modules 130, 132, 134, 136 may be implemented.

Figure 3:
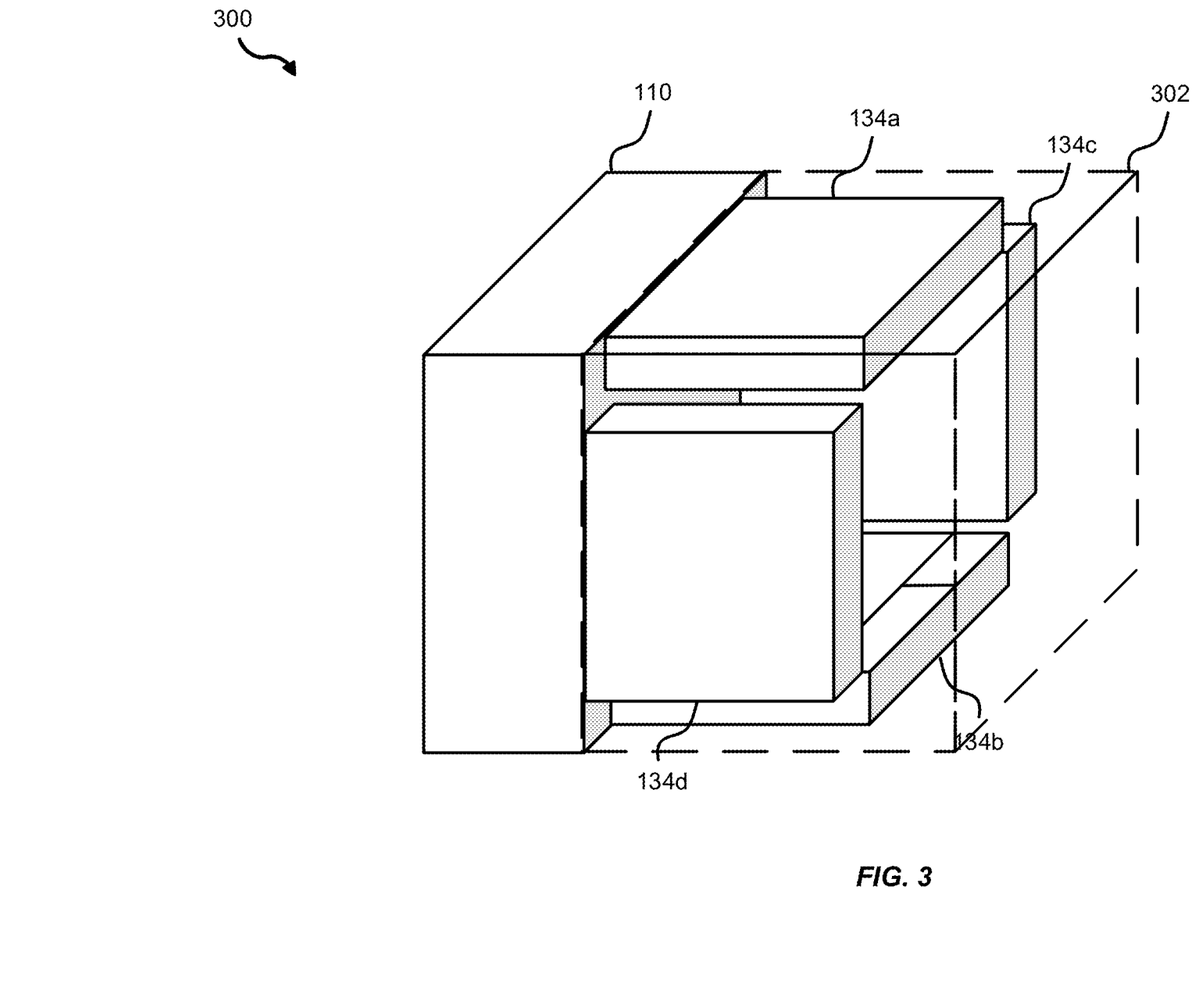
FIG. 3 illustrates an example of a perspective view of a fan with one or more tunable sound attenuating modules according to aspects of the present disclosures.

Turning to FIG. 3, an example of a configuration 300 for disposing the third tunable sound attenuating modules 134 at or substantially at the fan 110. The fan 110 may be coupled with or to a duct 302. The fan 110 may move air (such as the received air 120) through the duct 302. The third tunable sound attenuating modules 134a, 134b, 134c, 134d may be coupled to the inner surfaces of the duct 302. The fan 110 may generate sound. In some aspects, the blades (not shown) of the fan 110 may generate the sound.

Figure 4:
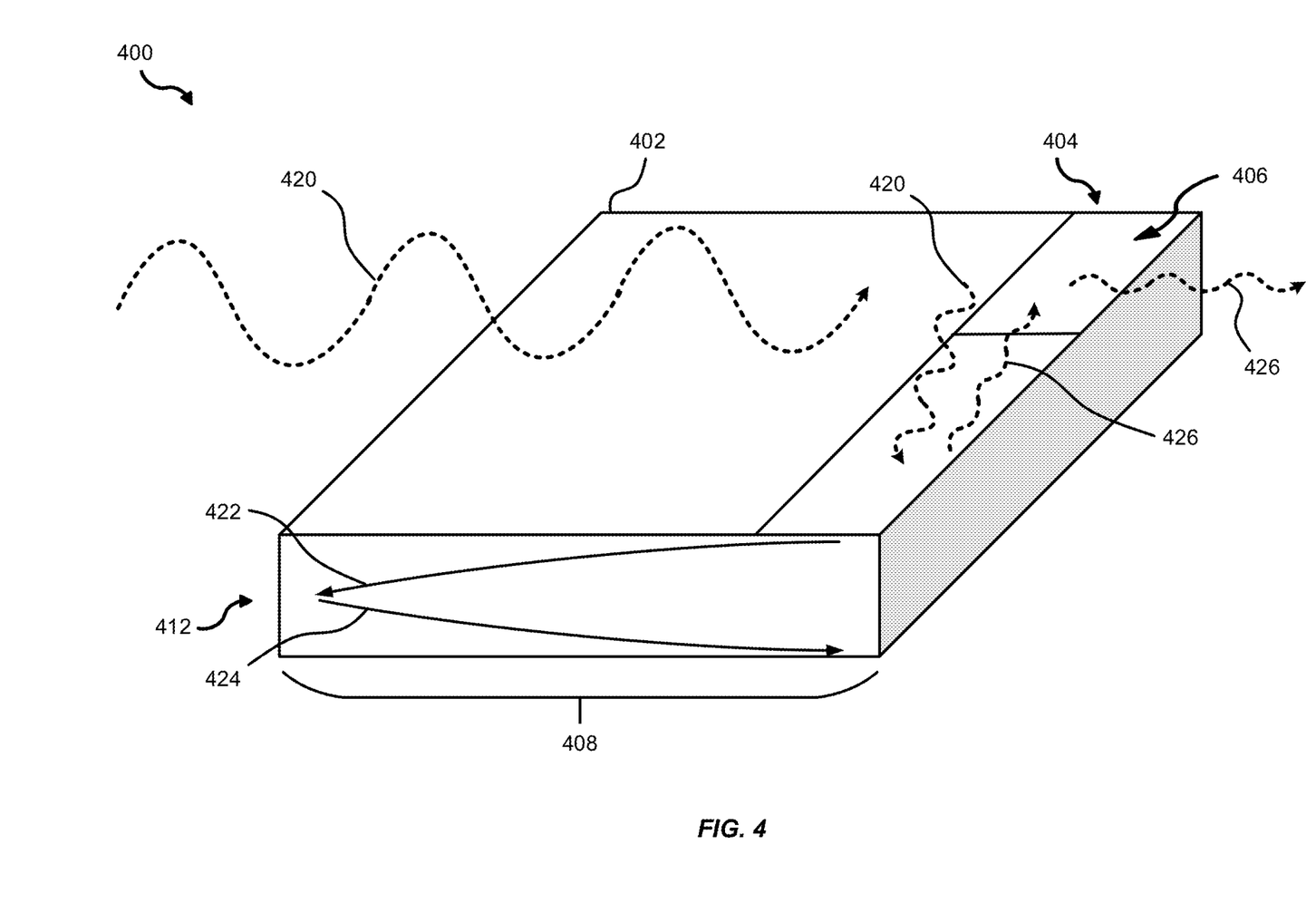
FIG. 4 illustrates an example of a tunable sound attenuating module in accordance with aspects of the present disclosures.

Turning to FIG. 4 and referencing FIG. 1, an example of a tunable sound attenuating module 400 utilizing quarter wave resonators may include a body 402. The body 402 may be in the shape of a cuboid, a triangular prism, a cylinder, a cube, or other shapes. The shape of the body 402 may depend on space requirement in the air handling unit 100, weight requirement of the tunable sound attenuating module 400, or other factors. The tunable sound attenuating module 400 may include an opening 404 to a cavity 406 inside the tunable sound attenuating module 400. In one example, the tunable sound attenuating module 400 may be hollow. The tunable sound attenuating module 400 and/or the cavity 406 may have a length 408 of 1. The tunable sound attenuating module 400 may be arranged such that sound is propagating as a plane wave at the openings 404.

During operation of the air handling unit 100 (FIG. 1), an incident sound wave 420 (e.g., from the fan 110) may enter the cavity 406 via the opening 404 of the tunable sound attenuating module 400. The incident sound wave 420 may have a wavelength of 4l. The incident sound wave 420 may become an interacting quarter wave 422. The interacting quarter wave 422 may have the same wavelength of 4l as the incident sound wave 420. As the interacting quarter wave 422 impinges on a back wall 412 of the tunable sound attenuating module 400, the acoustic energy in the interacting quarter wave 422 may be converted to generate a reflected quarter wave 424. The reflected quarter wave 424 may have the same wavelength of 4l as the interacting quarter wave 422. The reflected quarter wave 424 may exit the cavity 406 via the opening 404 of the tunable sound attenuating module 400. The phase of the reflected quarter wave 424 may be offset from the interacting quarter wave 422 by 7E radian or one hundred eighty degrees (180°). As a result, the interacting quarter wave 422 and the reflected quarter wave 424 may destructively interfere. The interference of the incident sound wave 420 and the reflected quarter wave 424 leads to the resulting sound wave 426. The resulting sound wave 426 may include less acoustic energy than the incident sound wave 420. For example, the acoustic energy of the resulting sound wave 426 may be 5, 10, 20, or more decibels lower than acoustic energy of the incident sound wave 420. In some implementations, the tunable sound attenuating module 400 may be oriented such that the incident sound wave 420 propagates perpendicular to the opening 404.

In other aspects of the present disclosures, one or more tunable sound attenuating modules, such as the tunable sound attenuating module 400, may be disposed in or around other HVAC equipment, such as a terminal unit, a ceiling fan, a fan coil, a diffuser, a chilled beam, or other systems that generate sound. Tunable sound attenuating modules of different lengths may be placed in or around a HVAC equipment based on the frequency or frequency range of the sound. In some examples, multiple tunable sound attenuating modules each having a different length may be placed in a HVAC equipment.

In some aspects of the present disclosures, the tunable sound attenuating module 400 may be configured as a quarter-wave sound resonator. In other aspects, the tunable sound attenuating module 400 may be configured as a Helmholtz resonator.

In some instances, the cavity 406 may be hollow (e.g., does not include fiber glass or other materials for muffling sound). The tunable sound attenuating module 400 may be made of plastic, metal, synthetic material, ceramic, etc.

Figure 5:
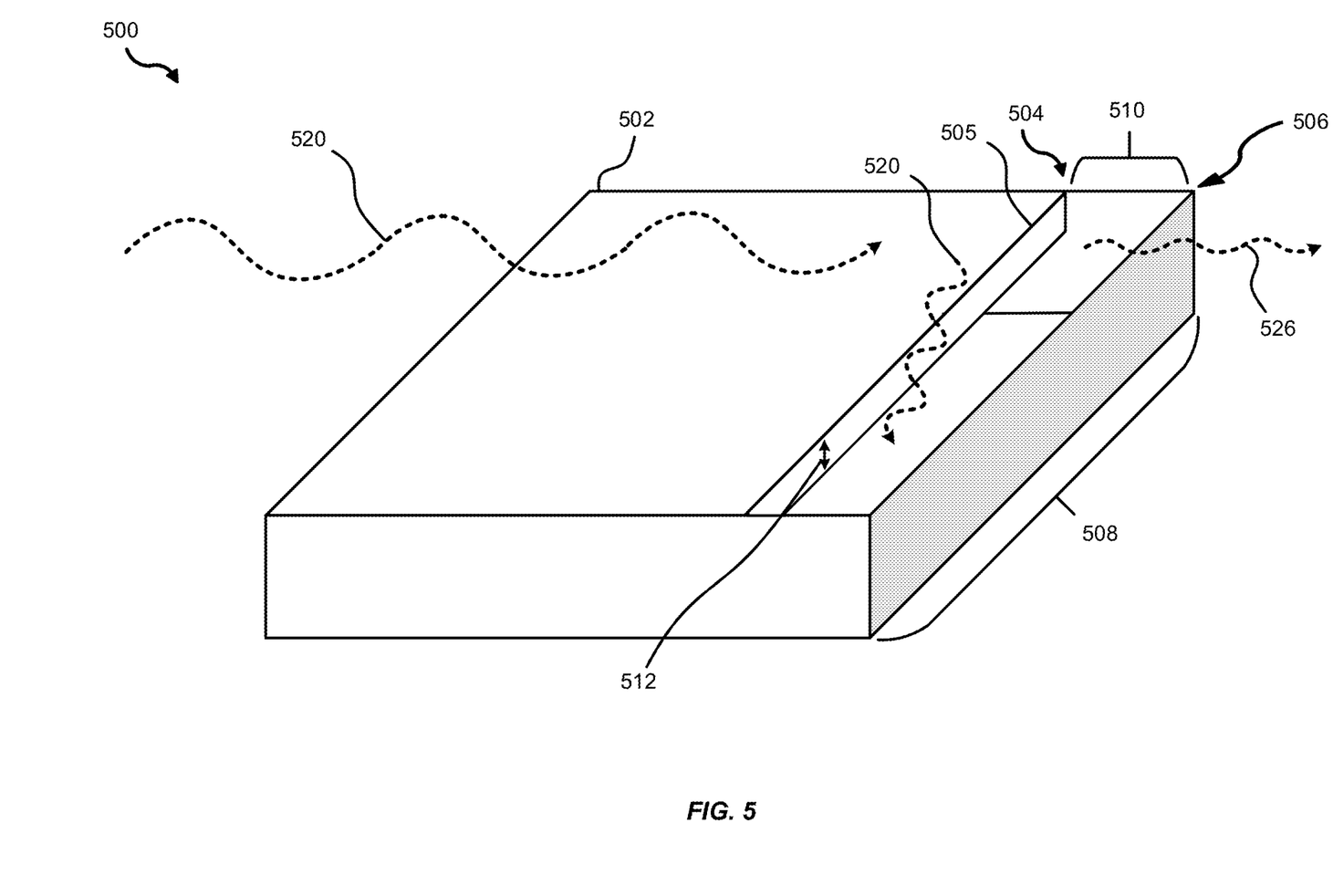
FIG. 5 illustrates another example of a tunable sound attenuating module in accordance with aspects of the present disclosures.

Turning to FIG. 5. an example of a tunable sound attenuating module 500 utilizing Helmholtz resonators may include a body 502. The body 502 of the tunable sound attenuating module 500 may be in the shape of a cuboid, a triangular prism, a cylinder, a cube, or other shapes. The shape of the tunable sound attenuating module 500 may depend on space requirement in the air handling unit 100 (FIG. 1), weight requirement of the tunable sound attenuating module 500, or other factors. The body 502 of the tunable sound attenuating module 500 may include an opening 504 to a cavity 506 inside the body 502. In one example, the body 502 may be hollow. The body 502 may include a neck 505 having a depth 512. The body 502 and/or the cavity 506 may have a volume V and the opening 504 may have a length 508, a width 510, and an area A equaling to a product of the length 508 and the width 510. The tunable sound attenuating module 500 may be arranged such that sound is propagating as a plane wave at the opening 504.

During operation of the air handling unit 100 (FIG. 1), an incident sound wave 520 may propagate as a plane wave at the opening 504. The incident sound wave 520 may enter the tunable sound attenuating module 500 and resonate at a resonant frequency f. The resonant frequency f may be calculated by the equation $$f = \left(\frac{S}{2\pi}\right)\sqrt{\frac{A}{LV}},$$

where S is the speed of sound, A is the area of the opening 504, L is the depth 512 of the neck 505, and V is the volume of the body 502. The resonance within the tunable sound attenuating module 500 may dissipate a portion of the acoustic energy in the incident sound wave 520. A resulting sound wave 526 may exit the tunable sound attenuating module 500. The resulting sound wave 426 may include less acoustic energy than the incident sound wave 520. For example, the acoustic energy of the resulting sound wave 526 may be 5, 10, 20, or more decibels lower than acoustic energy of the incident sound wave 520. In some implementations, the tunable sound attenuating module 500 may be oriented such that the incident sound wave 520 propagates perpendicular to the opening 504.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An air handling unit, comprising:
a casing comprising an air inlet and an air outlet;
a fan configured to move air along an air flow path from the air inlet to the air outlet;
a first tunable sound attenuating module having a first opening at a first end of the first tunable sound attenuating module, a first cavity, and a first back wall at a second end of the first tunable sound attenuating module, wherein:
the first end of the first tunable sound attenuating module is opposed to the second end of the first tunable sound attenuating module;
the first tunable sound attenuating module is oriented such that the first back wall is closer to the fan than the first opening;
a first length of the first tunable sound attenuating module is substantially one fourth of an acoustic wavelength of a sound generated by the fan; and
the first length of the first tunable sound attenuating module extends in a direction of the air moving along the air flow path; and
a second tunable sound attenuating module having a second opening at a first end of the second tunable sound attenuating module, a second cavity, and a second back wall at a second end of the second tunable sound attenuating module, wherein:
a second length of the second tunable sound attenuating module extends in the direction of the air moving along the air flow path;
the second opening is disposed opposite the first opening relative to the air flow path; and
the second opening and the first opening face one another.

2. The air handling unit of claim 1, wherein the first tunable sound attenuating module is oriented such that the sound is propagated perpendicular to the opening.

3. The air handling unit of claim 1, further comprising a cooling coil disposed within the casing and configured to cool the air moved from the air inlet to the air outlet.

4. The air handling unit of claim 1, wherein the first tunable sound attenuating module is disposed between the fan and the air inlet.

5. The air handling unit of claim 1, wherein the first tunable sound attenuating module and the second tunable sound attenuating module are disposed opposite one another across the air inlet.

6. The air handling unit of claim 1, wherein the second tunable sound attenuating module is disposed between the air inlet and the fan.

7. The air handling unit of claim 1, wherein the second length of the second tunable sound attenuating module is substantially one fourth of the acoustic wavelength of the sound generated by the fan.

8. The air handling unit of the claim 1, comprising a plurality of tunable sound attenuating modules, wherein:
the plurality of tunable sound attenuating modules comprises the first tunable sound attenuating module, the second tunable sound attenuating module, a third tunable sound attenuating module, and a fourth tunable sound attenuating module, and
the third tunable sound attenuating module and the fourth tunable sound attenuating module are disposed opposite one another relative to the air flow path.

9. The air handling unit of claim 8, wherein the plurality of tunable sound attenuating modules is disposed substantially at the air inlet.

10. The air handling unit of claim 8, wherein the plurality of tunable sound attenuating modules is disposed substantially at a front of the fan.

11. The air handling unit of claim 8, wherein the first tunable sound attenuating module and the second tunable sound attenuating module are disposed substantially at a front of the fan, and the third tunable sound attenuating module and the fourth tunable sound attenuating module are disposed substantially at a back of the fan.

12. The air handling unit of claim 9, wherein the plurality of tunable sound attenuating modules is a first plurality of tunable sound attenuating modules, and the air handling unit comprises:
a second plurality of tunable sound attenuating modules disposed substantially at a front of the fan;
a third plurality of tunable sound attenuating modules disposed substantially at a back of the fan; and
a fourth plurality of tunable sound attenuating modules disposed substantially at the air outlet.

13. The air handling unit of claim 1, wherein a shape of the first tunable sound attenuating module is a cuboid.

14. An air handling unit, comprising:
a casing comprising an air flow path extending from an air inlet of the casing to an air outlet of the casing;
a fan configured to move air from the air inlet to the air outlet;
a first tunable sound attenuating module having a first opening at a first end of the first tunable sound attenuating module, a first cavity extending from the first end of the first tunable sound attenuating module to a second end of the first tunable sound attenuating module, and a first neck, wherein:
the first end of the first tunable sound attenuating module is opposed to the second end of the first tunable sound attenuating module;
the first tunable sound attenuating module is oriented such that the second end of the first tunable sound attenuating module is closer to the fan than the first end of the first tunable sound attenuating module; and
the first tunable sound attenuating module is a Helmholtz resonator; and
a second tunable sound attenuating module having a second opening at a first end of the second tunable sound attenuating module, a second cavity extending from the first end of the second tunable sound attenuating module to a second end of the second tunable sound attenuating module, and a second neck, wherein:
the first end of the second tunable sound attenuating module is opposed to the second end of the second tunable sound attenuating module, wherein the second end of the second tunable sound attenuating module is closer to the fan than the first end of the second tunable sound attenuating module; and
the second tunable sound attenuating module is disposed opposite the first tunable sound attenuating module relative to the fan.

15. The air handling unit of claim 14, wherein at least one of a depth of the first neck, a length of the first opening, a width of the first opening, or a volume of the first cavity is based on a frequency of a sound generated by the fan.

16. The air handling unit of claim 15, wherein the first tunable sound attenuating module is oriented such that the sound is propagated perpendicular to the first opening.

17. The air handling unit of the claim 14, comprising a plurality of tunable sound attenuating modules including the first tunable sound attenuating module, the second tunable sound attenuating module, a third tunable sound attenuating module, and a fourth tunable sound attenuating module, the third tunable sound attenuating module comprises a third opening, and the fourth tunable sound attenuating module comprises a fourth opening, the first opening and the third opening face one another and are disposed opposite one another relative to the air flow path, and the second opening and the fourth opening face one another and are disposed opposite one another relative to the air flow path.

18. The air handling unit of claim 17, wherein the first tunable sound attenuating module is disposed at a front of the fan.

19. The air handling unit of claim 18, wherein the second tunable sound attenuating module is disposed at a back of the fan.

20. The air handling unit of claim 17, wherein:
a first subset of the plurality of tunable sound attenuating modules is disposed substantially at the air inlet;
a second subset of the plurality of tunable sound attenuating modules is disposed substantially at a front of the fan;
a third subset of the plurality of tunable sound attenuating modules is disposed substantially at a back of the fan; and
a fourth subset of the plurality of tunable sound attenuating modules is disposed substantially at the air outlet.

21. The air handling unit of claim 17, wherein the first tunable sound attenuating module is coupled to an upstream end of the fan, and the second tunable sound attenuating module is coupled to a downstream end of the fan.

22. The air handling unit of claim 17, wherein the first tunable sound attenuating module is configured to attenuate a first frequency of a sound generated by the fan, and the second tunable sound attenuating module is configured to attenuate a second frequency of the sound generated by the fan.

23. A heating, ventilation, and air conditioning (HVAC) equipment, comprising:
a casing having an air inlet at a first end of the HVAC equipment and an air outlet at a second end of the HVAC equipment;
a fan disposed within the casing between the air inlet and the air outlet, wherein the fan is configured to move received air entering the casing from the air inlet toward the air outlet along an air flow path through the casing;
a first tunable sound attenuating module having a first opening at a first end of the first tunable sound attenuating module, a first cavity, and a first back wall at a second end of the first tunable sound attenuating module, wherein:
the first cavity is hollow;
the first end of the first tunable sound attenuating module is opposed to the second end of the first tunable sound attenuating module;
the first tunable sound attenuating module is oriented such that the second end of the first tunable sound attenuating module is closer to the fan than the first end of the first tunable sound attenuating module; and
the first end of the first tunable sound attenuating module is disposed at the air inlet or the air outlet of the casing; and
a second tunable sound attenuating module having a second opening at a first end of the second tunable sound attenuating module, a second cavity, and a second back wall at a second end of the second tunable sound attenuating module, wherein:
the first end of the second tunable sound attenuating module is opposed to the second end of the second tunable sound attenuating module;
the second tunable sound attenuating module is oriented such that the second end of the second tunable sound attenuating module is closer to the fan than the first end of the second tunable sound attenuating module;
the second opening is disposed opposite the first opening relative to the air flow path; and
the second opening and the first opening face one another.

24. The HVAC equipment of claim 23, wherein a length of the first tunable sound attenuating module is substantially one fourth of an acoustic wavelength of a sound generated by the fan.

25. The HVAC equipment of claim 24, wherein:
the first end of the first tunable sound attenuating module is detachably coupled to the second end of the HVAC equipment; and
the first end of the second tunable sound attenuating module is detachably coupled to the second end of the HVAC equipment.

26. The HVAC equipment of claim 24, wherein:
the first end of the first tunable sound attenuating module is detachably coupled to the first end of the HVAC equipment; and
the first end of the second tunable sound attenuating module is detachably coupled to the first end of the HVAC equipment.

27. The HVAC equipment of claim 24, further comprising a cooling coil or a heating coil disposed within the casing between the air inlet and the air outlet.

28. The HVAC equipment of claim 24, comprising a plurality of tunable sound attenuating modules including the first tunable sound attenuating module, the second tunable sound attenuating module, a third tunable sound attenuating module, and a fourth tunable sound attenuating module, the third tunable sound attenuating module comprises a third opening, and the fourth tunable sound attenuating module comprises a fourth opening, and the third opening and the fourth opening face one another and are disposed opposite one another relative to the air flow path.

29. The HVAC equipment of claim 28, wherein:
a first subset of the plurality of tunable sound attenuating modules is disposed substantially at the air inlet;
a second subset of the plurality of tunable sound attenuating modules is disposed substantially at a front of the fan;
a third subset of the plurality of tunable sound attenuating modules is disposed substantially at a back of the fan; and
a fourth subset of the plurality of tunable sound attenuating modules is disposed substantially at the air outlet.

30. The HVAC equipment of claim 23, wherein a shape of the first tunable sound attenuating module is a cuboid.

31. The HVAC equipment of claim 23, wherein the first tunable sound attenuating module includes a neck and is a Helmholtz resonator.

32. The HVAC equipment of claim 31, wherein at least one of a depth of the neck, a length of the first opening, a width of the first opening, or a volume of the first cavity is based on a frequency of a sound generated by the fan.

33. The HVAC equipment of claim 23, wherein the first tunable sound attenuating module is quarter-wave resonator.

* * * * *